Feb. 3, 1953 T. L. HALLENBECK 2,627,086
MOLDING MACHINE
Filed Sept. 17, 1949 5 Sheets-Sheet 1
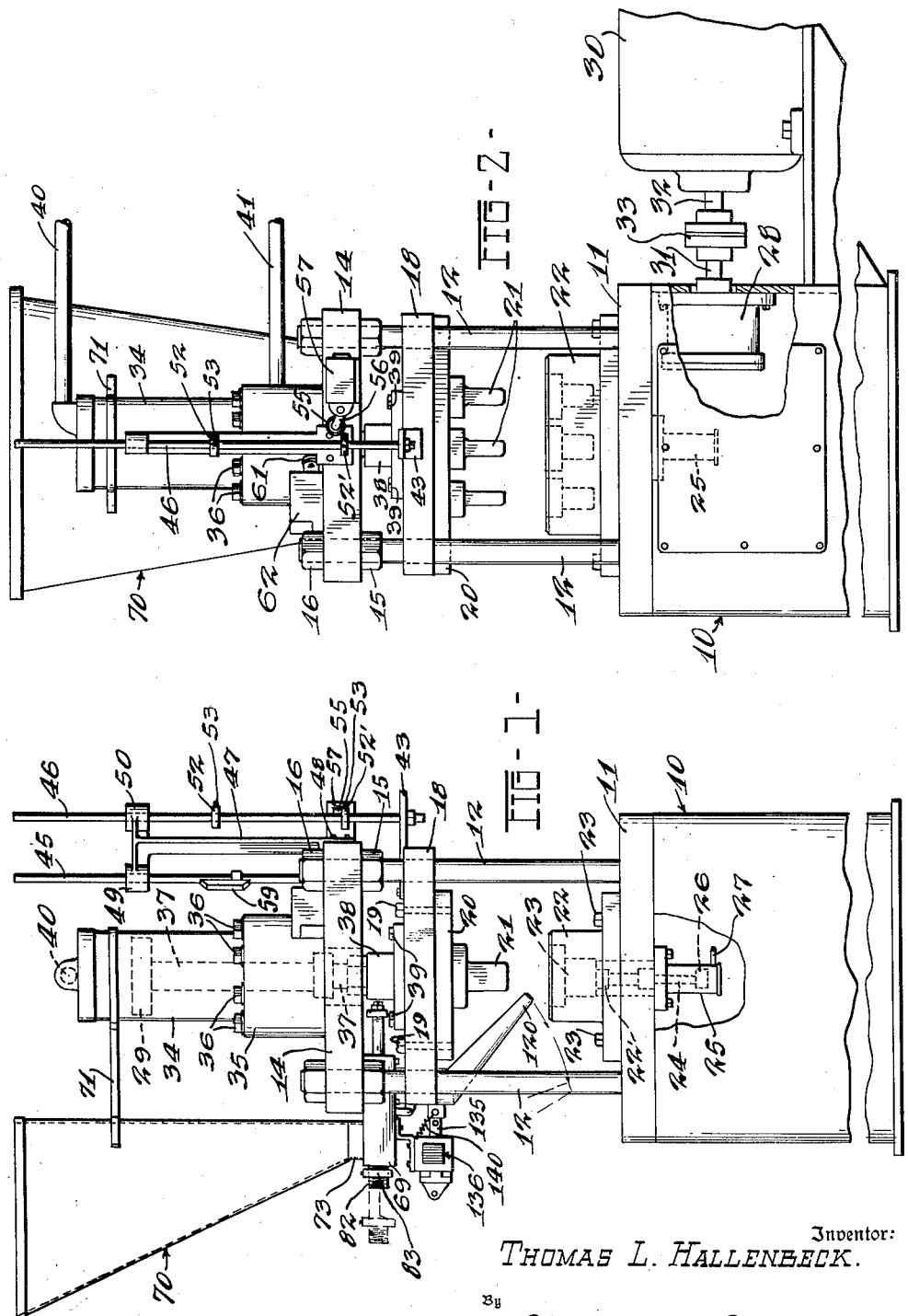
Inventor:
THOMAS L. HALLENBECK.
By Harry A. Ernsberger
Attorney

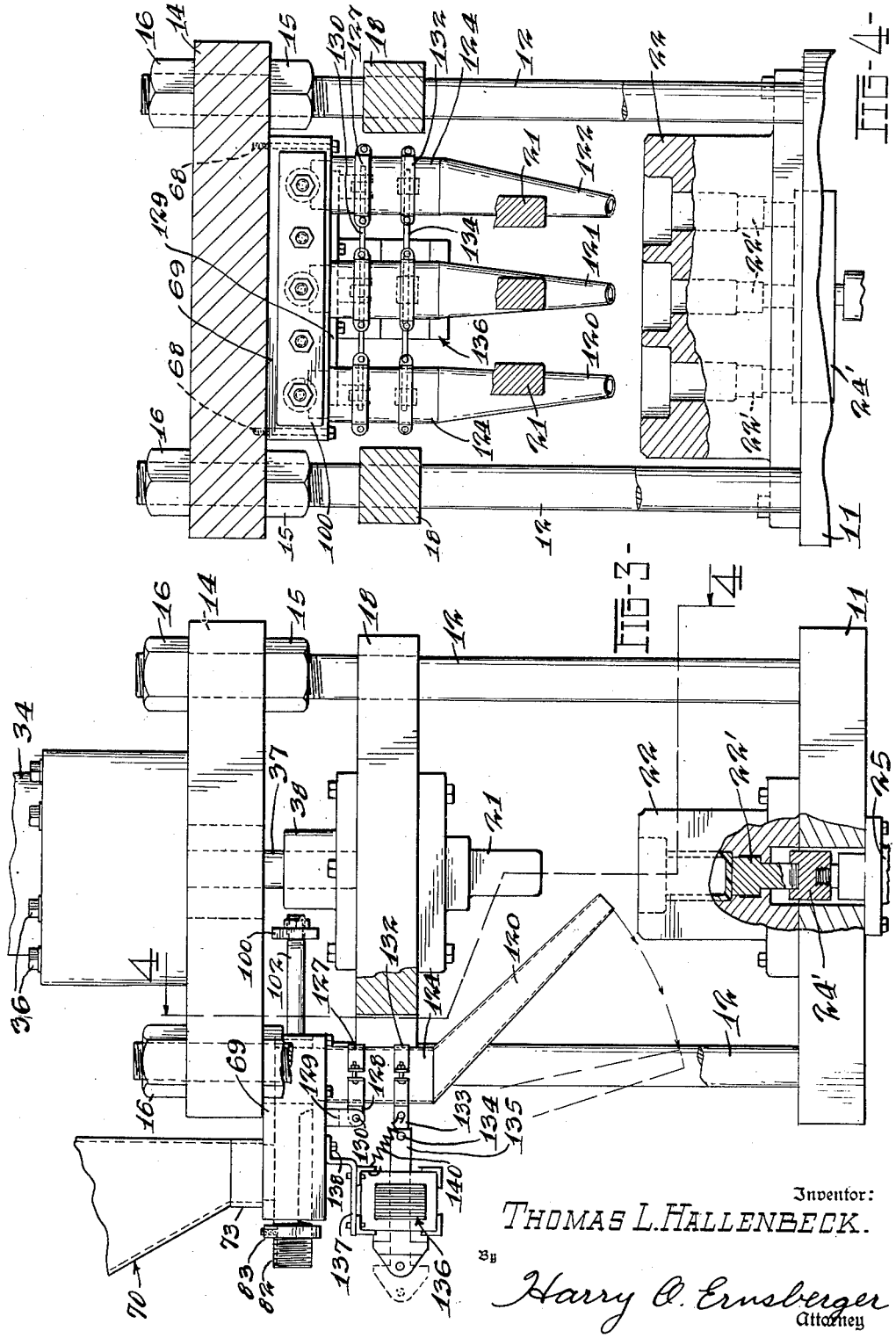

Feb. 3, 1953          T. L. HALLENBECK          2,627,086
MOLDING MACHINE
Filed Sept. 17, 1949          5 Sheets-Sheet 3
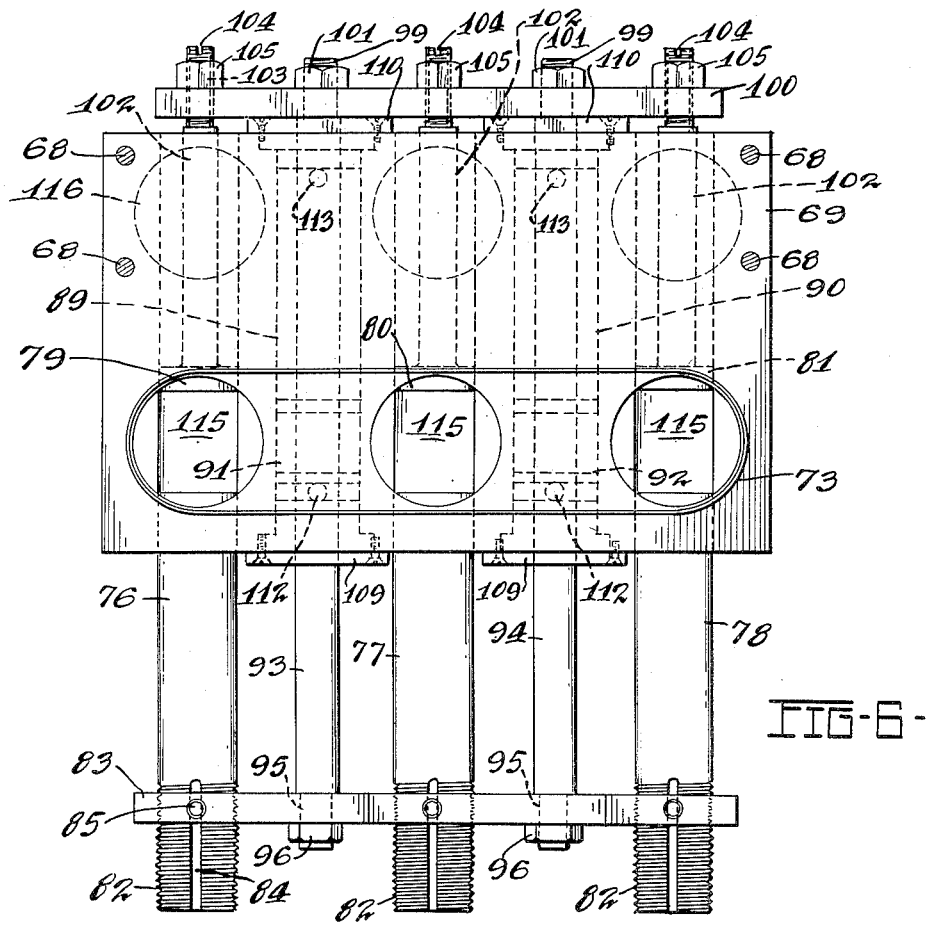
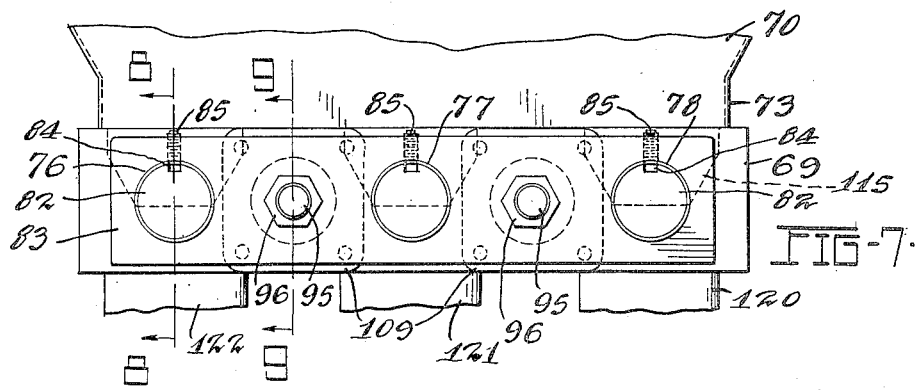
Inventor:
THOMAS L. HALLENBECK.
By Harry O. Ernsberger
Attorney

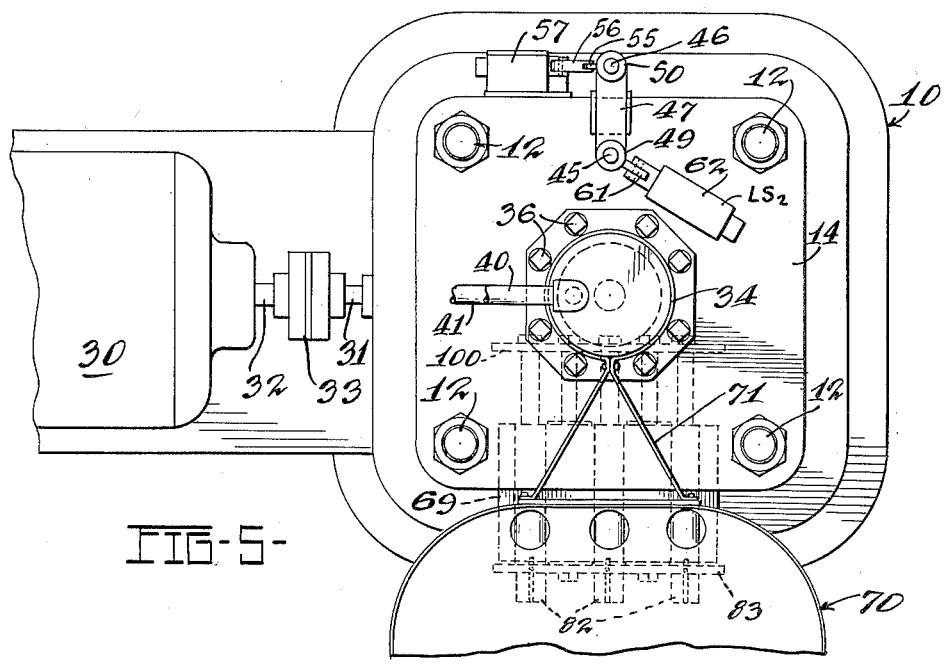
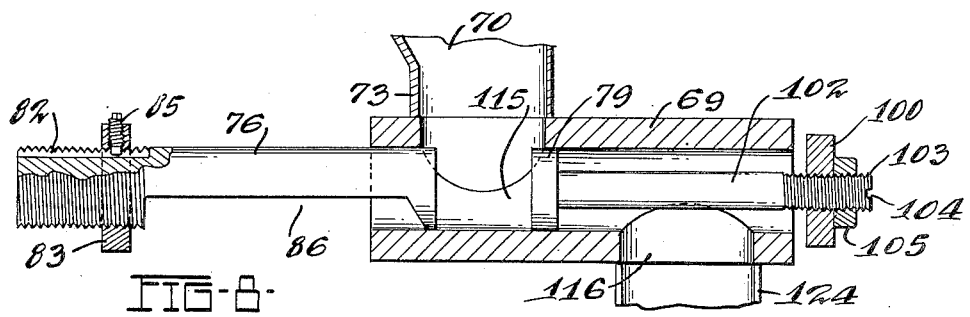
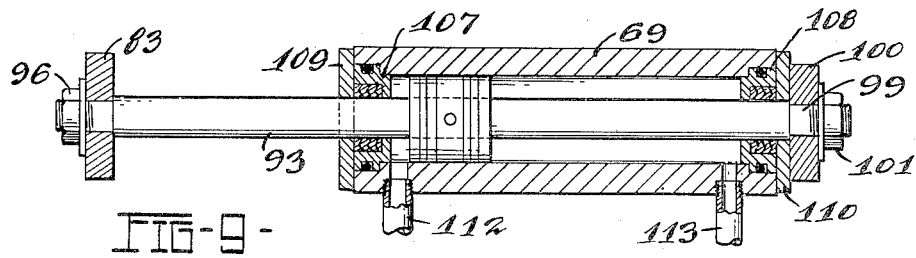
Inventor:
THOMAS L. HALLENBECK.
By Harry O. Ernsberger
Attorney

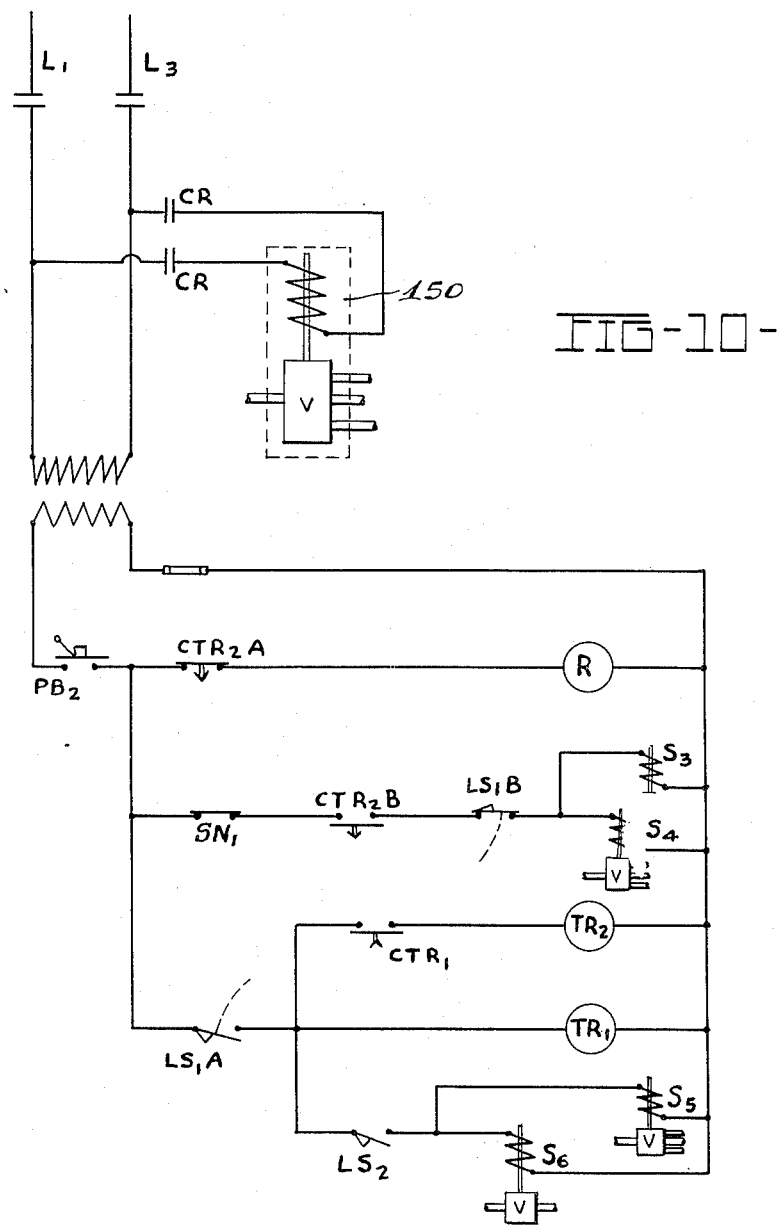

Patented Feb. 3, 1953

2,627,086

UNITED STATES PATENT OFFICE 2,627,086

MOLDING MACHINE

Thomas L. Hallenbeck, Toledo, Ohio, assignor to Baker Brothers, Inc., Toledo, Ohio, a corporation of Ohio Application September 17, 1949, Serial No. 116,276

6 Claims. (Cl. 18—30)

This invention relates to method and apparatus for molding articles from plastic materials and more especially to an arrangement for measuring and feeding or transferring the raw material from a supply to the molds or dies in carrying out molding operations.

In the molding or formation of articles from moldable resins or plastic materials, the raw material or resin used is in comminuted or granulated form. In feeding or conveying the comminuted raw material to the molding die, difficulties have been encountered in metering or measuring the materials and conveying the measured or predetermined quantities of the material to the molding apparatus. One of the factors presenting a difficulty in the molding of plastics is that it is imperative that the molding machine operate at a comparatively high speed to mold or form a large number of molded items in a minimum of time in order to obtain commercially practicable, economic production.

The present invention has for one of its principal objects a combined raw material measuring and transferring means particularly adaptable for use with plastic molding machines wherein an accurate measure or quantity of comminuted raw material may be quickly made and the measured material transferred to a position for rapid conveyance into the die or molding means.

Another object of the invention resides in the provision of a combined measuring and transferring device for use with raw materials supplied to molding machines in which one or more measured quantities may be simultaneously attained and wherein each measuring device or unit is independently adjustable to vary the quantity of raw material supplied or transferred by each measuring unit to its respective die whereby several articles may be formed and cured simultaneously on a single machine or press.

Still another object of the invention is the provision of a material measuring and conveying apparatus for plastic molding machines wherein the material measuring and transferring means is operated in synchronism with the movements of the molding machine ram in a manner in which a high rate of production is attained.

Still another object of the invention is the provision of a relatively movable material conveying chute arranged to receive and direct the raw material from the measuring and transferring device into the mold or die which is actuated by means correlated with movement of the ram of the machine whereby the chute is moved out of the locus of the ram during a molding and curing operation of the machine.

A further object of the invention resides in the provision of electrically controlled fluid actuated means for rapidly moving the material measuring and transferring means from a material receiving position to a material discharging position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a front elevational view of a molding machine or apparatus embodying my invention for molding or forming plastic or resinous materials into various shapes and configurations;

Figure 2 is a side elevational view of the machine shown in Figure 1;

Figure 3 is a fragmentary elevational view of a part of the machine illustrating the plastic material measuring and conveying means of my invention;

Figure 4 is a vertical sectional view taken substantially on the line 4—4 of Figure 3;

Figure 5 is a top plan view of the apparatus shown in Figure 1, a portion of the raw material containing hopper being broken away;

Figure 6 is a plan view of the raw material measuring and transferring means forming a part of the invention;

Figure 7 is a front elevational view of the arrangement shown in Figure 6;

Figure 8 is a detail sectional view taken substantially on the line 8—8 of Figure 7;

Figure 9 is a vertical sectional view taken substantially on the line 9—9 of Figure 7, and Figure 10 is a schematic diagram of the electrical circuits for the actuating and controlling devices for various mechanisms of the apparatus.

While I have illustrated a preferred form of my invention as utilized for measuring and transferring or feeding resinous or plastic raw materials to a molding die, it is to be understood that I contemplate the utilization of the principles of my invention for measuring and transferring materials of all kinds wherever an embodiment of my invention may be found to have utility.

Referring to the drawings in detail, and first with respect to Figures 1 and 2, the apparatus or machine with which my invention is illustrated is of the type which is preferably fluid operated, the controlling devices therefor being electrically operated. The machine is inclusive of a base 10 upon which is mounted a bolster or base plate 11. Extending upwardly from the bolster plate 11 is a plurality of upright struts or rods 12 which support a frame plate 14. The rods 12 are threaded at their upper portions to receive threaded nuts 15 and 16 serving to secure the plate 14 to the rods 12. The plate 14 may be adjusted in a vertical direction by manipulation of the nuts 15 and 16. Reciprocably mounted upon the rods 12 is a platen or member 18, the rods forming ways to guide the platen 18 in its vertical slidable movements. The platen 18 carries a plate 20 which is secured to member 18 by means of bolts 19. The plate 20 is formed with the male portion 21 of a die. Mounted upon the bolster plate 11 is a die member 22 which is secured to the bolster by means of screws 23. The die member 22 is formed as a female portion of the die, the interior of the die being shaped to the desired configuration of the article or articles to be molded or formed. In the present embodiment, the die 22 is shaped to form three articles in one operation. Positioned beneath the bolster plate 11 is a small cylinder 25 in which is reciprocably mounted a piston 26 which is reciprocated by fluid means such as compressed air conveyed to the cylinder by a tube 27. The piston rod 24 associated with the piston 26 is connected to a bar 24' carrying pins 22' serving as means for ejecting the formed articles of plastic or other resin from the female portion of the die 22. The article ejector means 22' is reciprocated by the piston 26 by air pressure controlled by a suitable valve (not shown) actuated by electrical means set into operation by the relative position of the platen 18.

Mounted upon the frame member 14 is a cylinder 34 which is secured to a base member 35 connected to the plate 14 by means of screws 36. Disposed within the cylinder 34 is a piston 29 which is connected by means of a piston rod or ram 37 to a fitting 38 which is secured to the platen 18 by means of bolts 39. Connected to the cylinder 34 are fluid conveying tubes 40 and 41 arranged adjacent each end of the cylinder for conveying fluid to and from the cylinder 34. The tubes 40 and 41 are connected to a conventional four way hydraulic control valve (not shown) which is in communication with a fluid pump 28 and a fluid reservoir (not shown). The pump 28 may be a conventional hydraulic type and is driven by an electrically energizable motor 30, the pump shaft 31 being connected to the motor shaft 32 by means of a suitable coupling 33. Thus by introducing liquid or other fluid under pressure through the tube 40 to the cylinder 34 above the piston 29, the fluid drives the piston 29 and platen 18 downwardly. By reversing the flow of fluid, that is, by causing the fluid to flow to the cylinder 34 through the tube 41, the fluid acts upon the lower surface of the piston 29 and elevates the piston 29, platen 18 and die 21 carried thereby.

Actuating and control means are provided for initiating the operation of several mechanisms of the apparatus. Secured to the ram 18 is a bracket or arm 43 and mounted upon the bracket 43 is a pair of upwardly extending rods 45 and 46. Secured to one side of the frame plate 14 is an arm 47 connected to the frame member 14 by means of bolts or screws 48. The upper extremity of the arm 47 is formed with laterally or transversely extending boss portions 49 and 50 which are bored to slidably accommodate the rods 45 and 46. The boss portions 49 and 50 form guiding means to maintain the rods 45 and 46 in parallel relation during reciprocation thereof. As the rods 45 and 46 are secured to the bracket 43 which in turn is fixedly mounted upon the platen 18, the rods 45 and 46 will be reciprocated simultaneously with the platen. Abutment or cam members 52 and 52' are adjustably supported upon the rod 46 through the medium of set screws 53. The abutments are arranged to selectively engage a roller 55 carried by a switch arm 56 pivoted upon a switch casing 57, the abutments being adapted to engage the roller 55 and actuate the switch mechanism at the upper and lower limits of reciprocable movement of the platen 18. Mounted upon the rod 45 is a cam member 59 which is adjustably secured upon the rod 45. The cam member 59 is arranged to engage a switch arm 61 pivotally supported on a switch housing 62. The housings 57 and 64 contain circuit controlling switches for the various mechanisms as hereinafter explained.

The means and apparatus for measuring, transferring or feeding the raw or uncured plastic or resinous material to the die 22 will now be described. Secured to the frame plate 14 by means of screws 68 is a substantially rectangular block 69 which is shown in detail in Figures 6 and 7. Disposed above the block 69 is a hopper or receptacle 70 adapted to contain a supply of comminuted plastic or resin, that is, the raw materials from which the articles to be molded are fabricated. The hopper 70 is secured to the cylinder 34 by means of a suitable bracket 71. The lower end of the hopper 70 terminates in a transversely elongated chute-like portion 73 engaging the upper surface of the block 69. The block 69 is formed with a plurality of parallel transversely spaced bores within which are slideably disposed plungers 76, 77 and 78 as shown in Figures 6 and 7. Also disposed in the bores in the block 69 and respectively in alignment with the plungers 76, 77 and 78 are plungers 79, 80 and 81. The plungers 76, 77 and 78 are formed with threaded portions 82 arranged to be threaded into threaded bores formed in a plate 83. Each of the plungers 76, 77 and 78 is also formed adjacent the threaded portions 82 with one or more longitudinally extending keyways 84. The plate 83 is provided with threaded openings adjacent each of the threaded portions 82 to receive and accommodate set screws 85. The set screws 85 are formed with tenons arranged to extend into the keyways 84 in the threaded portions 82 of the plungers 76, 77 and 78. By releasing the set screws 85, the plungers may be selectively rotated to different positions and the set screws 85 again tightened to engage in the keyways 84 and thus adjustably secure the plungers 76, 77 and 78 to the plate or member 83.

The block 69 is also formed with a pair of parallel bores 89 and 90 disposed at each side of the central bore in the block 69 containing the plungers 77 and 80. Each of the bores 89 and 90 form a cylinder to respectively accommodate pistons 91 and 92. Pistons 91 and 92 are respectively carried on piston rods 93 and 94. The ends of piston rods 93 and 94 adjacent the plate 83 are provided with threaded tenons 95 which extend into suitable openings formed in plate 83, the rods being securely locked to the plate 83 by means of the nuts 96. The piston rods 93 and 94 extend through the cylinder bores 89 and 90 and are formed at their other ends with threaded tenon portions 99 which extend through suitable openings formed in a plate 100. The piston rods 93 and 94 are securely held to the plate 100 by means of the securing nuts 101. Plate 100 is similar in shape and dimension to the plate 83 and serves to connect the plungers 79, 80 and 81 in a manner whereby the same may reciprocate in the bores formed in the block 69. Each of the plungers 79, 80 and 81 are formed with cylindrical portions 102 of reduced diameter; each portion being provided at its extremity with a threaded tenon 103 adapted to be threaded into an opening formed in the plate 100. Each of the threaded portions 103 of the second set of plungers is provided with a kerf 104 adapted to receive a suitable tool for selectively adjusting the position of each of the plungers 79, 80 and 81 toward or away from the plungers 76, 77 and 78 respectively. The plungers 79, 80 and 81, are held in adjusted position with respect to the plate 100 by means of the securing nuts 105.

The ends of the cylinders 89 and 90 are provided with stuffing glands 107 and 108 as particularly shown in Figure 9. The stuffing glands are secured within the cylinder wall and serve to prevent the escape of actuating fluid along the piston rods. The stuffing glands 107 are held in place by means of plates 109 secured to the block 69 by suitable screws while the glands 108 are retained by means of the plates 110 secured to the block by screws. Each of the bores or cylinders 89 and 90 formed in the block 69 is provided with tubes 112 and 113 as shown in Figure 9 for conveying fluid under pressure to and from the cylinder at each side of the pistons 91 and 92. The tubes 112 and 113 are connected to suitable valve mechanism (not shown) connected with a source of air or fluid under pressure. By suitable operation of the valve (not shown) the direction of fluid to and from the cylinders 89 and 90 may be reversed to reciprocate the pistons 91 and 92 in the cylinders so as to reciprocate the plungers 76, 77, 78, 79, 80 and 81. I have found that compressed air provides a satisfactory operating fluid for this purpose.

It is to be noted particularly from examination of Figures 6 and 8 that the plungers 76, 77 and 78 are spaced from the ends of plungers 79, 80 and 81. Each of these spaces designated 115 provides a chamber between the juxtaposed ends of each set of plungers to receive comminuted raw or uncured plastic or resin material from the hopper 70. The extent of or size of the space 115 between each set of plungers measures or meters the amount of raw material to be transferred to one of the dies formed in the die plate 22 at each molding operation. Thus by adjusting one or the other or both plungers of each set the amount of resin to be conveyed to a particular mold may be accurately measured or determined. To secure a rough adjustment for a space 115 between the plungers 76 and 79, the operator backs off the set screw 85 from engagement with the keyway 84 and rotates the plunger 76 in either direction one or more complete revolutions and again draws up the set screw 85 into engagement with the keyway 84. By this means adjustment of plungers 76, 77 and 78 may be obtained in steps of one or more complete revolutions. If several keyways 84 are formed in each of the plungers 76, 77 and 78, adjustments may be made involving part of a complete revolution for each of the plungers. After this approximate adjustment has been obtained, an accurate determination or sizing of the space or chamber between each pair of the plungers is arrived at by loosening the lock nut 105 on portion 102 of the plungers 79, 80 or 81 and inserting a tool in the kerf 104 in the threaded tenon 103 to minutely rotate the plungers 79, 80 or 81 toward or away from the ends of plungers 76, 77 and 78, thus securing an accurate volumetric adjustment for the spaces 115. By means of these adjustments, the size of each space or chamber 115 may be changed or varied independently of the others so that a plurality of articles of different size or shape may be simultaneously molded in the compartments of the die block 22, there being three in the illustrated embodiment. Thus by means of the adjustments, the correct amount of resin or plastic raw material may be fed into each of the spaces 115. After the raw material has been fed by gravity from the hopper 70 into the spaces 115, air or other fluid under pressure enters the inlet pipes 112 at the lefthand side of pistons 91 and 92 as viewed in Figure 9 to drive the pistons in a righthand direction. This movement of pistons 91 and 92 simultaneously moves the plungers in a righthand direction as viewed in Figure 8 to bring the spaces 115 in registration with outlet passages 116 formed in the block 69. Portions of the walls of the plungers 76, 77 and 78 are preferably cut away as at 86 in order to reduce friction of these sliding elements.

Means are provided for conveying or directing the resinous or plastic raw material from the passages 116 to the mold configurations in the die 22. As particularly shown in Figures 3 and 4 I have provided a plurality of chutes or tubes 120, 121 and 122 disposed respectively beneath each of the outlet passages 116 formed in the block 69. Each of the chutes 120, 121 and 122 is provided with a cylindrical portion 124 adapted to register with one of the passages 116. Surrounding each of the cylindrical portions 124 of the material conveying chutes is a clamp 127 provided with a portion 128 pivoted to a bracket 129 by means of a pivot pin 130. In this manner each of the chutes 120, 121 and 122 is pivotally supported so as to swing about the axis of a pivot pin 130. Also surrounding the cylindrical portion 124 of each of the conveyor chutes is a second bracket or clamp 132 which has a projecting portion 133 connected by means of a pin 134 with the armature 135 of a solenoid mechanism 136. The solenoid structure 136 is supported by means of a bracket 137 connected to the block 69 by means of screws 138 and functions through the pin 134 to simultaneously swing all of the chutes when it is energized. A coil spring 140 is connected to a pin on the central member 132 and to a portion of the frame of the solenoid 136 so as to normally urge the chutes to pivot about the pin 130 in a clockwise direction as viewed in Figure 3, that is, each of the chutes is normally urged by the spring toward the dotted position as shown in Figure 3 out of the locus or path of vertical movement of the platen 18. The purpose of this mechanism is to move the chutes 120, 121 and 122 out of the path of the platen 18 simultaneously after the required or predetermined amount of resinous or plastic raw material has been discharged into the mold configurations in the die 22. In the embodiment illustrated the energization of the coil of solenoid 136 causes the armature 135 thereof to move in a righthand direction as viewed in Figure 3 overcoming the force of the spring 140 to move the chutes into the position illustrated in full lines in Figure 3, that is, in a position to discharge raw material into the die 22. This condition obtains at the time the platen reaches the top of its stroke, after rod 46 resets snap switch 57 and the circuit is completed through contacts of CTR2B, shown in Figure 10, which were closed at the bottom of the platen stroke and remain closed until the expiration of a predetermined time period. When the solenoid 136 is deenergized, the spring 140 immediately rotates the chutes in a clockwise direction as viewed in Figure 3 to move the chutes out of the path of downward movement of the platen 18 which carries the male portion of the die 21 into the die 22 to form the raw material into articles of the configuration of the molds formed in block 22.

The electrical circuits for actuating and controlling the mechanism for operating the platen, the material measuring and transferring means, the movable chutes, the article knockout means and air blast is shown in Figure 10. The source of current supply is indicated by lines L1 and L3. The solenoid for controlling a four way hydraulic valve is indicated at 150. A manual starting switch is shown at PB2. The limit switch means operated by abutments 52 and 52' and contained within the switch housing 57 is inclusive of two switches designated LS1A and LS1B. A second limit switch means designated LS2 is contained within the switch housing 62 and is operated by means of the cam 59 mounted on rod 45 carried by the platen 18. TR1 and TR2 designate timer relays, the timer relay TR1 being provided with contacts CTR1 and timer TR2 being provided with contacts CTR2. R designates a relay energizing the solenoid 150 for actuating a four way valve for selectively directing fluid under pressure to the ends of the cylinder 34 by means of the fluid conveying tubes 40 and 41 shown in Figure 2. S3 indicates the coil of the solenoid 136 illustrated in Figure 3 for swinging the material conveying chutes to operative position. S4 indicates a solenoid means for operating a valve for controlling the flow of compressed air or other actuating medium to the cylinders 89 and 90 for operating the material measuring and transferring means illustrated in Figures 6 and 7. S5 designates a solenoid control for a valve for controlling the flow of air under pressure to the cylinder 25 for actuating the piston 26 and knockout pins 22' for ejecting the molded articles upwardly from the die 22. S6 designates a solenoid control for a valve for controlling an air blast directed horizontally adjacent the die 22 to carry the molded articles transversely away from the die for deposit in a suitable receptacle. SN1 indicates a manual switch for the circuit through solenoids S3 and S4 for the purpose of operating the press without causing operation of the resin feeding means.

A typical cycle in the operation of the molding press and the sequence of actuation and movement of various elements and adjuncts of the apparatus is as follows: With particular reference to the electrical circuit of Figure 10, the operator first closes the manual starting switch PB2. This completes a circuit through the contacts CR of relay R energizing the solenoid 150 to actuate the four way valve for directing oil or other suitable liquid through tube 40, shown in Figure 2, whereby fluid pressure is exerted downwardly upon the piston 29 contained in the cylinder 34 to drive the piston 29 and platen 18 downwardly. When the platen 18 carried by the ram 37 reaches its lowermost position, the limit switch LS1A is then closed by engagement of the abutment 52 with the switch arm 56. At the same time the second switch member LS1B contained within the housing 57 is opened. The switches LS1A and LS1B are of the snap action type and remain in static position being actuated only by the abutments or stops 52 and 52' when the platen 18 reaches its upper and lower limits of reciprocal movement. Upon the closing of switch LS1A, the timer relay TR1 is energized and until the expiration of the time delay factor incorporated in the relay TR1, the solenoid 150 will be held in a position whereby fluid pressure continues to be exerted downwardly upon the piston 29 in the cylinder 34. This period of static position of the ram and platen in their lowermost positions provides time within which the material in the die 22, which has been pressed or molded to shape, is cured while the platen 18 and male die member 21 are at their lowermost positions. Suitable heating elements (not shown) are provided for the dies to heat them to the desired temperature required for curing the particular resin material utilized. At the expiration of the time delay period of relay TR1, the contact CTR1 is closed to energize the relay TR2 and simultaneously open the contact CTR2A which deenergizes the circuit through the relay R. The valve mechanism controlled by solenoid 150 is spring urged or loaded in one direction so that as soon as relay R is deenergized, solenoid 150 is thereby deenergized and the spring pressed fluid controlling valve automatically moved to its other position to direct liquid under pressure through tube 41 to the cylinder 34 beneath the piston 29, thus initiating the upward movement of ram 37, platen 18 and male die 21. As the platen 18 moves upwardly carrying with it the rod 45, the cam 59 thereon engages limit switch LS2 to energize the circuits through the solenoid controls S5 and S6. The solenoid S5 controls an air valve for directing air under pressure into the cylinder 25 to drive the piston 26 and ejector pins 22' upwardly for moving the article or articles out of the die 22. Simultaneously the energization of solenoid S6 actuates a valve to direct an air blast transversely of the die 22 to convey the finished articles to a suitable receptacle (not shown).

When the platen 18 reaches its uppermost position, the abutment 52' on the rod 46 actuates the limit switches contained in the housing 57 to open the switch LS1A and close the switch LS1B. Upon the closing of limit switch LS1B, the contact CTR2B having been previously closed by the action of relay TR2, a circuit is completed through the solenoids S3 and S4. The energization of solenoid S3 causes the armature 135 of the chute actuating means 136 to be moved in a right-hand direction as viewed in Figure 3 against the tension of the spring 140 to swing the chutes 120, 121 and 122 into the position illustrated in full lines in Figure 3 to direct the flow of raw resin or plastic into the die 22. At the same time the solenoid S4 is energized initiating the operation of air valves to direct air under pressure through the tubes 112 to the left-hand ends of the cylinders 89 and 90 as viewed in Figure 9 to move the measuring plungers 76, 77, 78, 79, 80 and 81 in a right-hand direction as viewed in Figures 1, 3 and 8 to transfer the resin or plastic material contained in the measuring spaces 115 above the chutes 120, 121 and 122 in registration with the outlets 116 in the block 69 whereby the raw resin or plastic material falls by gravity into the chutes and is directed thereby into the molding compartments of the die 22. The contact CTR2A is opened upon energization of TR2 and does not complete a circuit to reenergize relay R until LS1A is opened at the top position of the platen 18 and TR2 has functioned to complete its time delay period, the duration of which is sufficient to allow the material to be conveyed by the chutes into the die 22. At the expiration of the time delay period of TR2, CTR2A closes and the relay R is again energized causing the platen to be moved downwardly by fluid pressure in the cylinder 34 above the piston 29 to initiate another cycle of operation of the machine. At the same time that contact CTR2A closes, contact CTR2B opens de-energizing the circuit to the solenoids S3 and S4 returning the measuring device and conveying chute to their initial positions as shown in dotted lines in Figure 1 allowing the platen to move downwardly without interference.

The arrangement of my invention is especially adaptable for feeding thermosetting alkyd compounds such, for example, as polyester resins. This type of uncured resin is of free flowing, granular form, which at temperatures approximating 300° F. acquires the consistency of soft putty but remains in this state for only one or two seconds, thereafter rapidly setting to a hard mass under relatively low pressures. Complete curing may be effected in from 5 to 50 seconds depending upon the wall thickness of the article.

From the foregoing it is to be noted that the operation of the several mechanisms is entirely automatic, thus enabling the rapid production of molded articles of a uniform character as the present invention enables the automatic accurate measurement of the correct amount of raw material to fabricate the molded articles.

It is apparent that, within the scope of the invention, modifications and different arrangements may be made other than is herein disclosed, and the present disclosure is illustrative merely, the invention comprehending all variations thereof.

What I claim is:

1. A material measuring and conveying apparatus including, in combination, a member having a cylindrical bore formed therein; a pair of spaced plungers slidably mounted in said bore; a chamber adapted to receive material formed between said plungers; said member having a material receiving passage in communication with said bore and a material discharge passage out of alignment with said material receiving passage; a receptacle having a passage in registration with the material inlet passage in said member; said receptacle adapted to contain a supply of material; means for shifting the relative positions of said plungers for varying the size of the chamber; means for reciprocating said plungers longitudinally in said bore for conveying material contained in the chamber to the discharge outlet in said member, and means including a movable chute in registration with said material discharge outlet in said member for conveying material to a point remote from said plungers.

2. A material measuring and transferring means for measuring and transferring comminuted material including, in combination, a relatively stationary member formed with a cylindrical passage; a material receiving opening and a material discharge opening formed in said member and in communication with said passage; said material receiving and discharge openings being out of registration; an element mounted for relative movement with respect to said member; a pair of plungers having cylindrical portions carried by said element slidably disposed in said passage; said cylindrical portions being spaced apart forming a material receiving and measuring chamber; means for moving said element and plungers from a material receiving position to a material discharging position; a receptacle adapted to contain a supply of flowable material; said receptacle having an outlet in communication with the material inlet passage formed in said member; electrically-controlled fluid-actuated means for moving said element with respect to said member to bring the chamber formed between said plungers in registration alternately with the material receiving inlet passage and the material discharge passage formed in said member; and a relatively movable material conveying chute associated with said member and adapted for registration with the material discharge outlet in said member for conveying material to a point remote from said element.

3. In combination with apparatus for molding flowable material into solid articles; said apparatus having a relatively movable platen; a stationary die mounted on the apparatus; a die carried by said movable platen; a material measuring and transferring device for feeding material into the stationary die including a member; an element slidably mounted on said member having a cylindrical bore formed therein; a pair of plungers having cylindrical head portions slidably disposed in said bore and spaced apart forming a material receiving and measuring chamber; said plungers being adjustable relative to said member for varying the size of said measuring chamber; a receptacle associated with said member and adapted to contain a supply of flowable molding material; means including a passage for admitting material from said receptacle to the chamber formed by said plungers; said member being formed with a material discharge passage out of registration with the material admitting passage; a relatively movable material conveying chute associated with said member; said chute being movable from a position out-of-use to a position for discharging material from said chamber into the stationary die; means for sliding said element and plungers from the material receiving position of the chamber to material discharging position thereof; the means for moving said element to material discharging position and for moving said chute to a position to discharge material into the stationary die being controlled by the relative position of the platen with respect to the stationary die.

4. A material measuring and transferring device including, in combination, a member having a plurality of bores formed therein; a material inlet and discharge outlet formed in each of said bores; said material inlet of each bore being out of registration with the material outlet thereof; a pair of spaced plunger elements slidable in each of said bores; the space between each pair of elements forming a material receiving and measuring chamber; means for effecting relative adjustment between each pair of plunger elements for independently regulating the size of each of the material receiving chambers; a receptacle having communication with the material receiving inlet passages in said bores and adapted to contain a supply of flowable material; means including a plurality of material conveying chutes respectively in registration with the discharge outlet passages in said members for conveying the material in the chambers to zones removed from said elements; and means for moving said plunger elements to material discharging position concomitantly with the movement of said chutes to material discharging positions.

5. In combination with a press having a platen and a relatively stationary die for molding comminuted resinous material; a die carried by the movable platen; a material measuring and transferring means including a member having a bore formed therein; a pair of plungers reciprocably mounted in said bore; said pair of plungers being spaced apart forming a resinous material receiving chamber; a relatively movable element supporting said plungers; means for adjusting the positions of said plungers relative to said element for varying the size of said chamber; a material supply receptacle; said member having a material inlet arranged for communication with the chamber associated with said plungers; a material discharge outlet formed in said member and having communication with said bore; said outlet being out of registration with the material receiving inlet; a material conveying chute in registration with the material discharge outlet in said member and arranged to convey resinous material to the relatively stationary die; said chute being pivotally supported for movement away from said die; actuating means for moving said plungers to bring said chamber into registration with the material discharge outlet for conveying material from the chamber into the chute; actuating means for moving said chute to an operative position to discharge material into the relatively stationary die; both of said actuating means being brought into operation by movement of the platen carrying the relatively movable die.

6. In combination with apparatus for molding comminuted material into formed articles; said apparatus having a relatively stationary die; a movable platen carrying a die; a material measuring and conveying means including a member having a bore formed therein; a pair of plungers slidably mounted in said bore and spaced apart to form a chamber; an element supporting said plungers; a material receiving inlet in said member in communication with said bore; a material discharge outlet formed in said member in communication with said bore and out of registration with said inlet passage; a receptacle adapted to contain material associated with said member and having a passage in communication with the inlet passage in said member; a relatively movable material conveying chute associated with said member and in registration with the outlet passage in said member; said chute adapted to convey material into the relatively stationary die; fluid pressure means for actuating said element and plungers to convey material contained in the chamber formed between the plungers to the outlet passage in said member for discharging the material into said chute; means for swinging said chute to a position to discharge material into said relatively stationary die; said plunger actuating means and the means for swinging the chute being operative only when said platen and die carried thereby are spaced from the relatively stationary die; and electrically actuated control means for controlling the operation of said plunger and said chute; the operation of said electrically actuated control means being dependent upon the relative position of said movable platen.

THOMAS L. HALLENBECK.

REFERENCES CITED

The following references are of record in the file of this patent:

UNITED STATES PATENTS

| Number | Name | Date |
|---|---|---|
| 2,232,103 | Ernst et al. | Feb. 18, 1941 |
| 2,242,189 | Zelov et al. | May 13, 1941 |
| 2,353,276 | Stewart | July 11, 1944 |
| 2,371,195 | Strauss | Mar. 13, 1945 |
| 2,386,891 | Gregory, Jr. | Oct. 16, 1945 |
| 2,404,559 | Ashbaugh | July 23, 1946 |
| 2,433,654 | Dinzl | Dec. 30, 1947 |

FOREIGN PATENTS

| Number | Country | Date |
|---|---|---|
| 306,955 | Great Britain | Mar. 6, 1930 |